(12) United States Patent
Shin

(10) Patent No.: US 8,435,699 B2
(45) Date of Patent: May 7, 2013

(54) FUEL CARTRIDGE AND DIRECT METHANOL FUEL CELL HAVING THE SAME AND METHOD OF PURGING DIRECT METHANOL FUEL CELL USING THE FUEL CARTRIDGE

(75) Inventor: Chan-Gyun Shin, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 952 days.

(21) Appl. No.: 12/046,210

(22) Filed: Mar. 11, 2008

(65) Prior Publication Data

US 2009/0068507 A1   Mar. 12, 2009

(30) Foreign Application Priority Data

Sep. 7, 2007 (KR) .................. 10-2007-0090996

(51) Int. Cl.
*H01M 8/04* (2006.01)
(52) U.S. Cl.
USPC ............ 429/515; 429/512; 429/513; 429/506
(58) Field of Classification Search .................. 429/443, 429/427, 505, 506, 515, 513; 137/246.21, 137/288
See application file for complete search history.

(56) References Cited

U.S. PATENT DOCUMENTS

| 3,283,780 A * | 11/1966 | Sutton ...................... 137/614.04 |
| 2004/0009381 A1 | 1/2004 | Sakai et al. |
| 2004/0238777 A1 * | 12/2004 | Yang ........................... 251/149.6 |
| 2004/0247960 A1 | 12/2004 | Sato et al. |
| 2005/0118468 A1 | 6/2005 | Adams et al. |
| 2005/0164055 A1 | 7/2005 | Hasegawa et al. |
| 2006/0166061 A1 * | 7/2006 | Kimura et al. .................. 429/26 |
| 2006/0286427 A1 | 12/2006 | Nakano et al. |
| 2007/0104995 A1 | 5/2007 | Kajitani et al. |
| 2009/0186257 A1 | 7/2009 | Sakai et al. |

FOREIGN PATENT DOCUMENTS

| CN | 1879242 A | 12/2006 |
| JP | 2001-085038 | 3/2001 |
| JP | 3838947 | 2/2004 |
| JP | 2004-152741 A | 5/2004 |
| JP | 2004-164871 A | 6/2004 |
| JP | 2004-319467 A | 11/2004 |

(Continued)

OTHER PUBLICATIONS

"Fuel cells using dimethyl ether" published in Journal of Power Sources 163 (2006) 103-106 by Yoo et al.*

(Continued)

*Primary Examiner* — Basia Ridley
*Assistant Examiner* — Heng Chan
(74) *Attorney, Agent, or Firm* — Knobbe, Martens, Olson & Bear LLP

(57) ABSTRACT

A fuel cartridge capable of supplying two fuels to an anode of a fuel cell body without using a pump, a direct methanol fuel cell having the same, and a method of purging a direct methanol fuel cell using the fuel cartridge, fuel cartridge according to one exemplary embodiment comprising a first storage unit having a first port for entrance and exit of a fluid and storing a liquid first fuel; and a second storage unit having a second port for entrance and exit of a fluid and filling a second fuel at a constant pressure, wherein the first fuel is discharged into the first port by the pressure of the second fuel.

7 Claims, 5 Drawing Sheets

FOREIGN PATENT DOCUMENTS

| JP | 2005-032608 A | | 2/2005 |
|---|---|---|---|
| JP | 2005-166301 | | 6/2005 |
| JP | 2005-347267 | | 12/2005 |
| JP | 2006-144870 | | 8/2006 |
| JP | 2006-278173 A | | 10/2006 |
| KR | 1020060095222 A | | 8/2006 |
| KR | 10-2006-0102130 | * | 9/2006 |
| WO | WO 2007/032309 | | 3/2007 |

OTHER PUBLICATIONS

Office Action dated Jun. 23, 2009 in corresponding Korean priority application No. 10-2005-0055295, Not in English.

Chinese Office Action (SIPO Chinese and English Translation) dated Oct. 25, 2010 in related Chinese Patent Application No. 200810091098.0, which claims priority of the corresponding Korean priority application No. 10-2007-0090996.

SIPO Patent Gazette (Chinese and English Translation) for Chinese Patent No. ZL 200810091098.0, which is related to present application.

JPO Office Action in related Japanese Patent Application No. 2007-340668.

Office Action (Japanese only), issued Apr. 3, 2012 in JP 2007-340668, which claims priority of the corresponding Korean priority application No. 10-2007-0090996.

* cited by examiner

FUEL CARTRIDGE AND DIRECT METHANOL FUEL CELL HAVING THE SAME AND METHOD OF PURGING DIRECT METHANOL FUEL CELL USING THE FUEL CARTRIDGE

CROSS-REFERENCE TO RELATED APPLICATION

This application claims priority to and the benefit of Korean Patent Application No. 10-2007-0090996, filed on Sep. 7, 2007, in the Korean Intellectual Property Office, the entire contents of which is incorporated herein by reference.

BACKGROUND

1. Technical Field

The present disclosure relates to a fuel cartridge capable of supplying two fuels to an anode of a fuel cell body without using a pump, a direct methanol fuel cell having the same, and a method of purging a direct methanol fuel cell using the fuel cartridge.

2. Discussion of Related Art

Fuel cells have come into the spotlight as a pollution-free power supply system. Generation systems using fuel cells may be used as power generators in large edifices, power for electric automobiles, portable power supply, etc., and a variety of fuels, such as natural gas, city gas, naphtha, methanol, waste gas, and the like, may be advantageously used in the generation systems. All fuel cells basically operate on the same principle, and are divided, for example, into molten carbonate fuel cells (MCFC), solid oxide fuel cells (SOFC), polymer electrolyte fuel cells (PEFC), phosphoric acid fuel cells (PAFC), alkaline fuel cells (AFC), and the like, depending on the electrolyte used.

Among the above-mentioned fuel cells, polymer electrolyte fuel cells are divided into a polymer electrolyte membrane fuel cell or, proton exchange membrane fuel cells (PEMFC) and direct methanol fuel cells (DMFC), depending on the fuel used. The polymer electrolyte membrane fuel cell has advantages in the electrolyte is a solid polymer that does not corrode by electrolysis or evaporate. PEMFCs also typically yield a high electric current density per unit area. In addition, the polymer electrolyte membrane fuel cells typically have very high output characteristics and a low operating temperatures compared with other kinds of fuel cells, and, therefore, have been developed as portable power supplies for automobiles, etc., distributed power sources for residences, public buildings, etc., and a small power sources for electronic equipment, etc. Direct methanol fuel cells use directly use liquid-phase fuels such as methanol without using a fuel modifier and operate at less than about 100° C., and are consequently suitable as portable power supplies or small power supplies.

Typical direct methanol fuel cells include a fuel cell body having a stack structure where a single cell and a separator are generally laminated; and a fuel cartridge for supplying a fuel to the fuel cell body. The single cell comprises a membrane electrode assembly (MEA), which comprises a polymer electrolyte membrane, and an anode electrode and a cathode electrode coupled to opposite sides of the electrolyte membrane. Direct methanol fuel cell generate electric energy by electrochemically reacting a fuel supplied to the anode electrode with oxidizing agent supplied to the cathode electrode. The fuel cell stack comprises a plurality of MEAs separated by separators. The separator is also referred to as a bipolar plate or a current collector, and functions to supply the fuel to the anode electrode through an internally mounted flow field, to supply the oxidizing agent to the cathode electrode, and to collect electricity generated at the anode electrode and cathode electrode.

However, typical direct methanol fuel cells using fuel pumps to supply fuel stored in a fuel cartridge to a fuel cell body exhibit increased volume and noise of the system and decreases the energy efficiency.

Also, in typical direct methanol fuel cell systems carbon dioxide formed at an anode of the fuel cell body may accumulated after an extended operating time, which may prevent the supply of fuel, thereby leading to a lack of the fuel thereto. In addition, water flooding at the cathode of the fuel cell body during the operation of the fuel cell can also reduce the fuel supply. In typical direct methanol fuel cell systems the anode catalyst and a cathode support may be deteriorated rapidly due to the accumulation of carbon dioxide at the anode and water flooding at the cathode when the system operates for an extended time. Accordingly, there is a need for solving accumulation of carbon dioxide at the anode and water flooding at the cathode of typical direct methanol fuel cell systems.

SUMMARY OF THE INVENTION

Accordingly, the present disclosure solves one or more of such drawbacks, and therefore one object is to provide a fuel cartridge capable of employing a fuel that is compressed and stored after the use of liquid fuel while supplying the liquid fuel.

Another object is to provide a direct methanol fuel cell capable of employing two fuels together without using a fuel pump.

Still another object is to provide a method of purging a direct methanol fuel cell capable of solving the accumulation of carbon dioxide in an anode of a fuel cell body and the water flooding in a cathode, by using the above-mentioned fuel cartridge.

Some embodiments provide a fuel cartridge for a direct methanol fuel cell and a direct methanol fuel cell comprising the same. Embodiments of the fuel cartridge comprise two storage units, a first storage unit storing a first fuel, for example, methanol, and a second storage unit storing a pressurized second fuel, for example, dimethyl ether. The second storage unit is coupled to the first storage unit, thereby pressurizing the first fuel in the first storage unit, thereby eliminating the need for a fuel pump. Other embodiments provide methods for purging the anode and/or cathode of a fuel cell stack during operation of a fuel cell system comprising the fuel cartridge.

One aspect is achieved by providing a fuel cartridge including a first storage unit having a first port for entrance and exit of a fluid and storing a liquid first fuel; and a second storage unit having a second port for entrance and exit of a fluid and filling a second fuel at a constant pressure, wherein the first fuel is discharged into the first port by the pressure of the second fuel.

Preferably, the first storage unit may be installed as a first container, the second storage unit may be installed as a second container, and the fuel cartridge further include a pair of a coupling units having an port that is opened by coupling of the second container to the first container.

The first storage unit and the second storage unit may be installed as a single container, a barrier rib for dividing the first storage unit and the second storage unit may be installed in the single container, and the fuel cartridge further include a subpipe for coupling the second storage unit to the first storage unit. In this case, the fuel cartridge according to the present invention further include a subvalve coupled to the subpipe and controlling the amount or pressure of the second fuel passed through the subpipe.

Another aspect is achieved by providing a direct methanol fuel cell including a fuel cartridge including a first storage unit having a first port for entrance and exit of a fluid and storing a liquid first fuel; and a second storage unit having a second port for entrance and exit of a fluid and filling a second fuel at a constant pressure, wherein the first fuel is discharged into the first port by the pressure of the second fuel; and a fuel cell body for generating an electric energy by electrochemically reacting an oxidizing agent supplied to a cathode with the first fuel or the second fuel supplied from the fuel cartridge to an anode.

Still another aspect is achieved by providing a method of purging a direct methanol fuel cell where an anode of a fuel cell body is purged during the operation of the direct methanol fuel cell including a fuel cartridge including a first storage unit having a first port for entrance and exit of a fluid and storing a liquid first fuel and a second storage unit having a second port for entrance and exit of a fluid and filling a second fuel at a constant pressure, wherein the first fuel is discharged into the first port by the pressure of the second fuel; and a recycler for recycling unreacted fuels and water, which flow out from the fuel cell body, to the fuel cartridge, the method including steps of closing the first port of the fuel cartridge; closing a cathode outlet of the fuel cell body; and opening the second port for discharging the second fuel.

Yet another aspect is achieved by providing a method of purging a direct methanol fuel cell where an anode of a fuel cell body is purged during the operation of the direct methanol fuel cell including a fuel cartridge including a first storage unit having a first port for entrance and exit of a fluid and storing a liquid first fuel and a second storage unit having a second port for entrance and exit of a fluid and filling a second fuel at a constant pressure, wherein the first fuel is discharged into the first port by the pressure of the second fuel; and a recycler for recycling unreacted fuels and water, which flow out from the fuel cell body, to the fuel cartridge, the method including steps of closing the first port of the fuel cartridge; closing a discharging unit of the recycler for recycling the unreacted fuel and water; converting the opening of the cathode outlet in the fuel cell body from an open state to a closed state; and opening the closed cathode outlet.

Some embodiments provide a fuel cell fuel cartridge system, comprising: a first storage unit configured for storing a liquid first fuel, comprising a first fluid inlet/outlet port; and a second storage unit configured for storing comprising a second fuel at a substantially constant pressure, comprising a second fluid inlet/outlet port, wherein the second storage unit is coupled to the first storage unit and configured to pressurize the first storage unit.

In some embodiments, the first storage unit comprises a first container, the second storage unit comprises a second container, and the fuel cartridge further comprises: a first coupling unit fluidly connected to the first container, and a second coupling unit fluidly connected to the second container, wherein, the first coupling unit and second coupling unit are enageable to each other, and when engaged, open a port in at least one of the first coupling unit and second coupling unit, thereby fluidly connecting the first container to the second container.

Some embodiments further comprise a first valve disposed between a first port and the first container, wherein the first valve controls a fluid flow through the first port. Some embodiments further comprise a second valve disposed between a second port and the second container, wherein the second valve controls a fluid flow through the second port.

Some embodiments further comprise a controller coupled to the first valve and the second valve, wherein the controller is configured for independently controlling the first valve and the second valve, thereby permitting the fuel cartridge to supply a first fuel from the first storage unit and a second fuel from the second storage unit either simultaneously or separately.

In some embodiments, the fuel cartridge system comprises a single container comprising the first storage unit and the second storage unit; a barrier rib dividing the first storage unit from the second storage unit; and a subpipe fluidly coupling the second storage unit to the first storage unit. Some embodiments further comprise a subvalve coupled to the subpipe, wherein the subvalve is configured for controlling at least one of an and pressure of a second fuel flowing through the subpipe.

Some embodiments further comprise a first valve disposed between a first port and the first container, wherein the first valve controls a fluid flow through the first port. Some embodiments further comprise a second valve disposed between a second port and the second container, wherein the second valve controls a fluid flow through the second port.

Some embodiments further comprise a controller coupled to the first valve and the second valve, wherein the controller is configured for independently controlling the first valve, the second valve, and the subvalve, thereby permitting the fuel cartridge to supply a first fuel from first storage unit and the second fuel from second storage unit either simultaneously or separately.

Some embodiments further comprise a temperature maintenance unit coupled to the second storage unit configured for maintaining a temperature of the second storage unit within a predetermined temperature range. In some embodiments, the temperature maintenance unit comprises a heating apparatus configured for heating the second storage unit.

In some embodiments, the first fuel comprises methanol and the second fuel comprises dimethyl ether.

Some embodiments provide a direct methanol fuel cell, comprising: a fuel cartridge comprising a first storage unit comprising a first fluid inlet/outlet port configured for storing a liquid first fuel; and a second storage unit comprising a second fluid inlet/outlet port configured for storing a second fuel at a substantially constant pressure, wherein the second storage unit is coupled to the first storage unit, thereby pressurizing the first storage unit, permitting the discharge of the first fuel out of the first port; and a fuel cell body configured for generating electric energy by electrochemically reacting an oxidizing agent supplied to a cathode with at least one of the first fuel or the second fuel supplied from the fuel cartridge to an anode.

In some embodiments, the direct methanol fuel cell comprises a single container comprising the first storage unit and the second storage unit; a barrier rib disposed in the single container dividing the first storage unit from the second storage unit; a subpipe fluidly coupling the second storage unit to the first storage unit; and a subvalve coupled to the subpipe, wherein the subvalve is configured for controlling at least one of an amount or pressure of a second fuel flowing through the subpipe. Some embodiments further comprise a pipe fluidly coupling an anode inlet of the fuel cell body to the first fluid inlet/outlet port and the second fluid inlet/outlet port of the fuel cartridge.

Some embodiments further comprise a recycler, wherein the recycler comprises: a first inlet coupled to an anode outlet of the fuel cell body; a second inlet coupled to a cathode outlet of the fuel cell body; an exhaust unit configured for exhausting carbon dioxide; and a discharging unit fluidly coupled to the fuel cartridge, configured for discharging unreacted fuel and water into the fuel cartridge.

Some embodiments further comprise a first switching unit controlling through the second inlet; a second switching unit controlling a flow out of the exhaust unit; and a third switching unit controlling a flow out of the discharging unit. Some embodiments further comprise a controller coupled to fuel cartridge and the first, second, and third switching units and configured to control the operation thereof.

Some embodiments provide a method of purging an anode of a direct methanol fuel cell during the operation of the direct methanol fuel cell, the direct methanol fuel cell comprising: a fuel cartridge comprising a first storage unit comprising a first fluid inlet/outlet port configured for storing a liquid first fuel; and a second storage unit comprising a second fluid inlet/outlet port configured for storing a second fuel at a substantially constant pressure, wherein the second storage unit is coupled to the first storage unit, thereby pressurizing the first storage unit, permitting the discharge of first fuel out of the first port; a fuel cell body comprising an anode, a cathode, an anode inlet, an anode outlet, a cathode inlet, and a cathode outlet, wherein the anode inlet is fluidly coupled to the fuel cartridge; and a recycler comprising a discharging unit fluidly coupled with the fuel cartridge, wherein the recycler is fluidly coupled to the anode outlet and cathode outlet, and configured for recycling unreacted fuel and water from the fuel cell body to the fuel cartridge. The method comprises: closing the first fluid inlet/outlet port of the fuel cartridge; closing a cathode outlet of the fuel cell body; and opening the second fluid inlet/outlet port, thereby discharging the second fuel, thereby purging the anode of the direct methanol fuel cell.

Some embodiments further comprise opening the discharging unit of the recycler, thereby for recycling the unreacted fuel and water. Some embodiments further comprise closing a subpipe coupling the second storage unit to the first storage unit. In some embodiments, purging the anode for from about 10 seconds to about 30 seconds; and returning the direct methanol fuel cell to normal mode.

Some embodiments provide a method of purging a cathode of a direct methanol fuel cell during the operation of the direct methanol fuel cell, the direct methanol fuel cell comprising: a fuel cartridge comprising a first storage unit comprising a first fluid inlet/outlet port configured for storing a liquid first fuel; and a second storage unit comprising a second fluid inlet/outlet port configured for storing a second fuel at a substantially constant pressure, wherein the second storage unit is coupled to the first storage unit, thereby pressurizing the first storage unit, permitting the discharge of first fuel out of the first port; a fuel cell body comprising an anode, a cathode, an anode inlet, an anode outlet, a cathode inlet, and a cathode outlet, wherein the anode inlet is fluidly coupled to the fuel cartridge; and a recycler comprising a discharging unit fluidly coupled with the fuel cartridge, wherein the recycler is fluidly coupled to the anode outlet and cathode outlet, and configured for recycling unreacted fuel and water from the fuel cell body to the fuel cartridge. The method comprises: closing the first fluid inlet/outlet port of the fuel cartridge; closing the discharging unit of the recycler; closing the cathode outlet of the fuel cell body; and opening the cathode outlet.

In some embodiments, closing the cathode outlet comprises closing the cathode outlet for from about 10 seconds to about 30 seconds. Some embodiments further comprise maintaining the second fluid inlet/outlet port of the fuel cartridge in a closed state. Some embodiments further comprise returning the direct methanol fuel cell to a normal operation mode.

BRIEF DESCRIPTION OF THE DRAWINGS

These and/or other embodiments and features will become apparent and more readily appreciated from the following description of certain exemplary embodiments, taken in conjunction with the accompanying drawings of which.

DETAILED DESCRIPTION OF CERTAIN EMBODIMENTS

Certain embodiments will now be described more fully hereinafter with reference to the accompanying drawings, in which exemplary embodiments are illustrated However, these embodiments should not be construed as limiting the disclosure, but are provided so that the disclosure is thorough and complete, and will fully convey the scope thereof those skilled in the art.

Figure 1A:
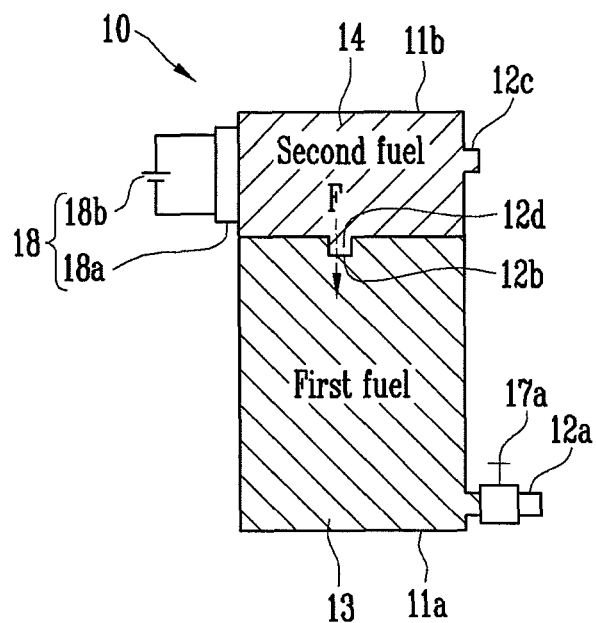
FIG. 1A is a schematic view showing an embodiment of a fuel cartridge.
Figure 1B:
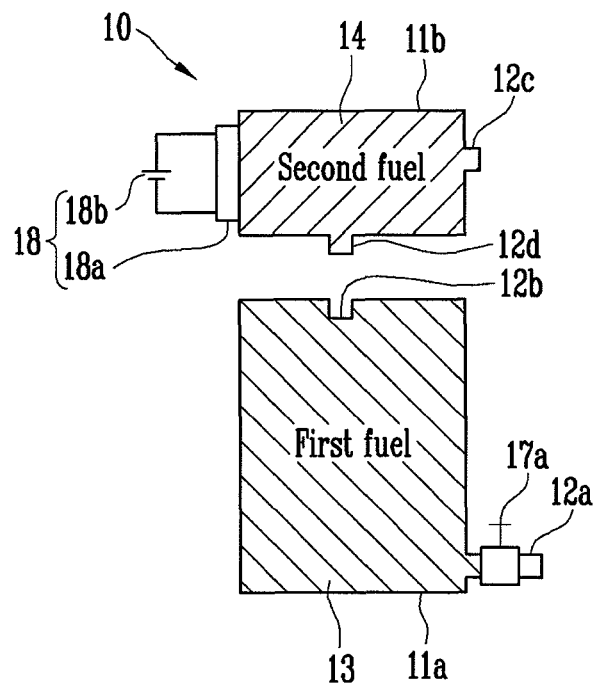
FIG. 1B is an exploded schematic view showing the fuel cartridge illustrated in FIG. 1A.

FIG. 1A is a schematic view showing an embodiment of a fuel cartridge 10. FIG. 1B is an exploded schematic view of the fuel cartridge 10 illustrated in FIG. 1A. Referring to FIG. 1A and FIG. 1B, the fuel cartridge 10 includes a first container 11a capable of enduring a predetermined positive pressure, and a second container 11b capable of enduring a predetermined positive pressure.

The first container 11a has a first port 12a for entrance and exit of a fluid, and a first coupling unit 12b. The first container 11a functions as a first storage unit for storing a liquid first fuel. A first valve 17a for controlling an opening of the first port 12a is installed between the first port 12a and the first container 11a.

The second container 11b has a second port 12c for entrance and exit of a fluid, and a second coupling unit 12d. The second container 11b functions as a second storage unit for storing a second fuel filled at a substantially constant pressure.

For this exemplary embodiment, the first storage unit 13 and the second storage unit 14 of the fuel cartridge 10 comprise a detachable first container 13 and second container 14, respectively, as shown in FIG. 1B. It is preferred to use methanol as the first fuel and use dimethyl ether (DME) as the second fuel. In this case, the second fuel is preferably filled in the second container 11b at a constant pressure, for example at a pressure greater than about atmospheric pressure, or at a pressure of about 8 atmospheres or less. When dimethyl ether is compressed to a pressure greater than about 8 atmospheres, the dimethyl ether may be liquefied. {Replace "are realized by" with "comprise" according to US practice. Replace "If" throughout as indefinite.}

The first container 11a and the second container 11b preferably comprise high strength members having corrosion resistance to the first fuel and the second fuel. High strength plastics coated with metal, alloy, or corrosion-resistant materials, etc. may be used as the materials of the first container 11a and the second container 11b.

In the case of the above-mentioned fuel cartridge 10, the first coupling unit 12b of the first container 11a and the second coupling unit 12d of the second container 11b are engaged with and coupled to each other when the first container 11a and the second container 11b are coupled together. When the first coupling unit 12b and the second coupling unit 12d are coupled to each other, a port is opened by means of their coupling structure, and therefore a constant pressure is applied to the first fuel stored in the first container 11a by the second fuel compressed and stored in the second container 11b. At this time, when the first port 12a of the first container 11a is opened, the first fuel stored in the first container 11a is discharged by the pressure of the second fuel.

Also, the fuel cartridge 10 may further include a temperature maintenance unit 18 that is coupled to and installed in or on the second container 11b to maintain a constant temperature of a fluid stored in the second container 11b.

The temperature maintenance unit 18 may comprise a cooling device for cooling the second container 11b, or a heating apparatus for heating the second container 11b, or a combination thereof. Where the temperature maintenance unit 18 comprises a heating apparatus, the heating apparatus may comprise a heating portion 18a coupled to an outer surface of the second container 11b, converts electric energy to heat energy releasing the heat energy to the second container 11b; and a power supply unit 18b for supplying electric energy to the heating portion 18a. Where the temperature maintenance unit 18 is used, the second fuel stored in the second container 11b may be adjusted to a desired temperature range using one or more gases with volumes that change to a constant level according to the temperature, and therefore it is possible to suitably control the amount of first fuel discharged by means of the pressure of the second fuel. Also, a heat exchanging apparatus having a heat exchanger extending at least to an inner space of the second container 11b, chemical cooling/heating apparatus, or a heat exchanging apparatus using waste heat, etc. may be suitably used as the temperature maintenance unit 18.

As described above, when the fuel cartridge 10 is fluidly connected with a direct methanol fuel cell system, that is, when the first port 12a is opened, the fuel cartridge 10 may automatically supply the liquid first fuel stored in the first container 11a to the fuel cell body using a pressure (F) of the second fuel compressed and stored in the second container 11b. In addition, the amount of the discharged first fuel may be suitably controlled by adjusting the second fuel to a desired temperature range using the temperature maintenance unit 18 coupled to the second container 11b.

Figure 3:
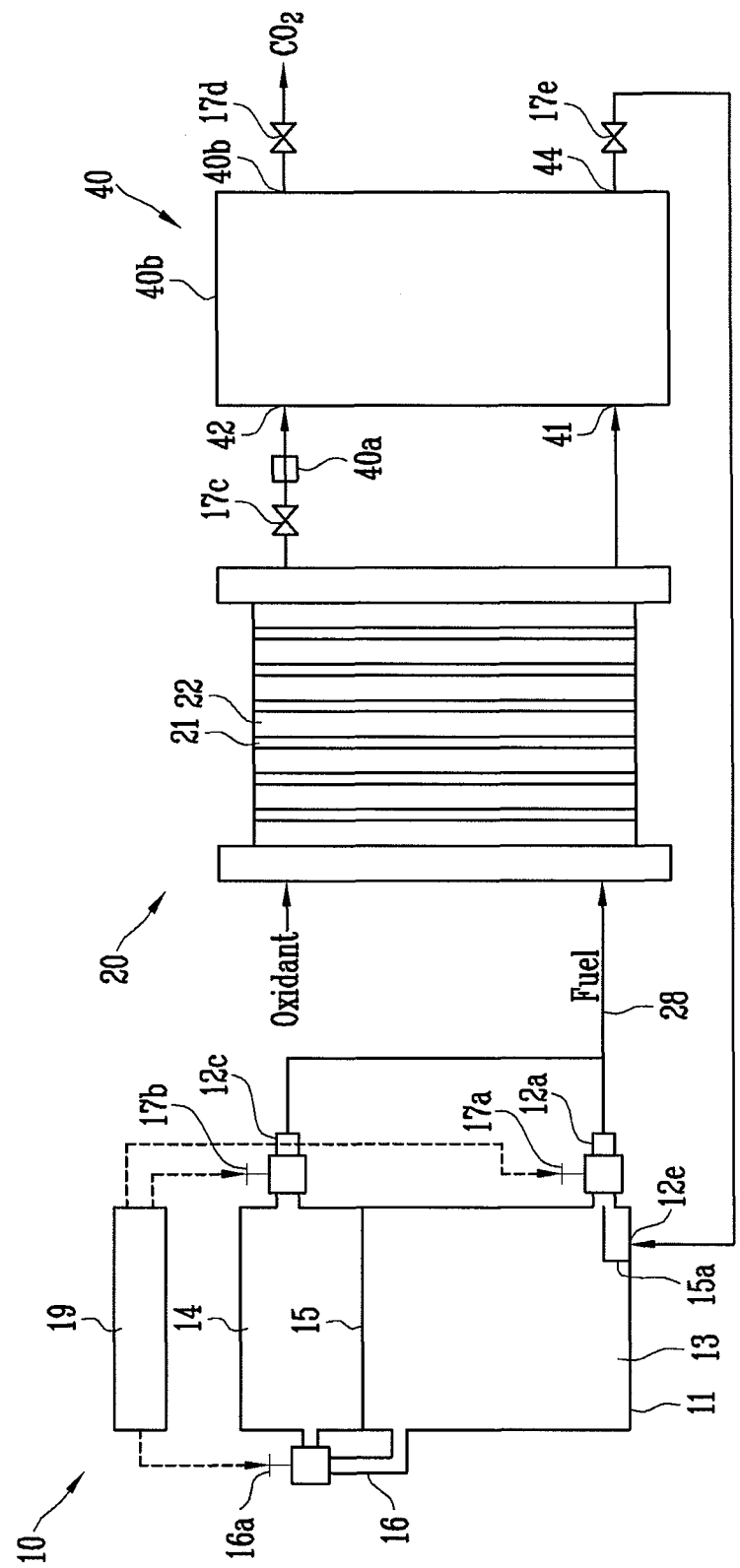
FIG. 3 is a schematic view showing an embodiment of a direct methanol fuel cell comprising an embodiment of the fuel cartridge.

Meanwhile, the above-mentioned fuel cartridge 10 comprise a single container 11, as shown in the left portion of FIG. 3, without a separate first container 11a and second container 11b. In this case, the single container 11 may include a barrier rib 15 for dividing an inner space into a first storage unit 13 and a second storage unit 14. And, the single container 11 may include a subpipe 16 for coupling the second storage unit 14 to the first storage unit 13 to discharge the first fuel stored in the first storage unit 13 using the pressure of the second fuel stored in the second storage unit 14; and a subvalve 16a for controlling an port of the subpipe 16. According to this modified embodiment, it is possible to suitably control the amount of the discharged first fuel by using the subvalve 16a coupled to the subpipe 16.

Figure 2A:
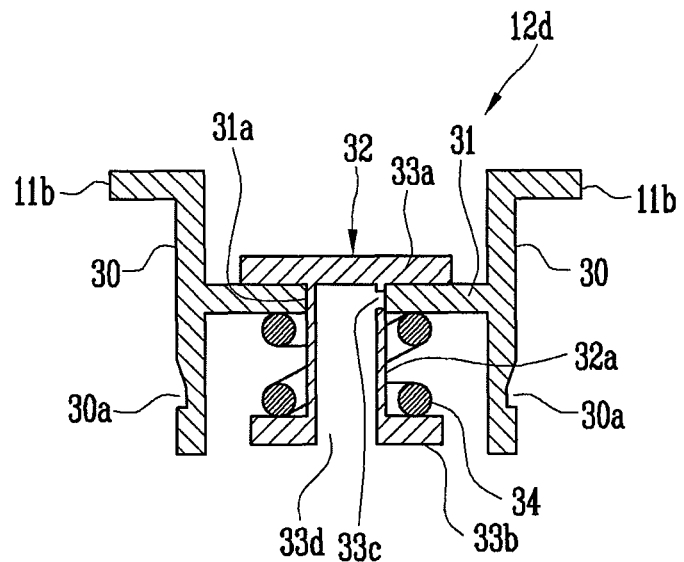
FIGS. 2A and 2B are cross-sectional views showing an embodiment of a coupling unit.
Figure 2B:
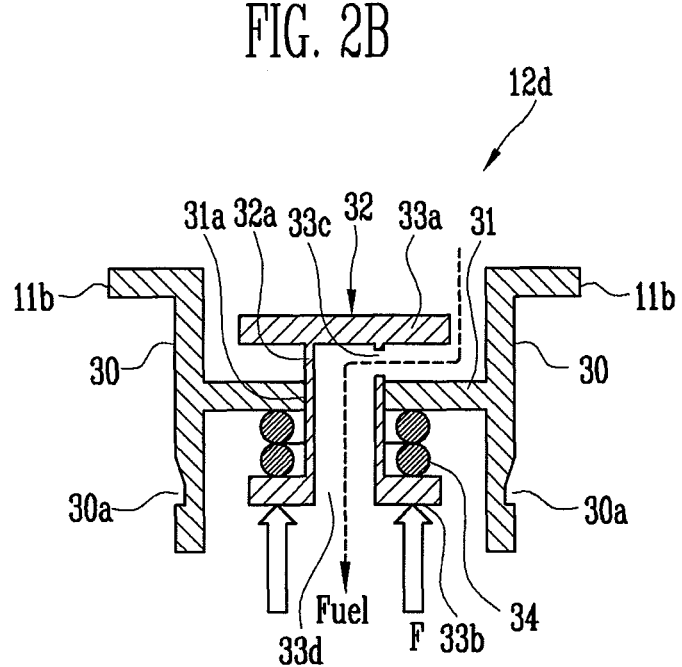

FIGS. 2A and 2B are cross-sectional views showing an embodiment of a coupling unit 12d that is suitable for coupling first container 11a to the second container 11b of the fuel cartridge. FIG. 2A shows a configuration of the second coupling unit 12d before coupling to the first coupling unit 12b of the first container 11a in the configuration shown in FIG. 1A, and FIG. 2B shows a configuration of the coupling unit 12d after the second coupling unit 12d of the second container 11b is coupled to the first coupling unit 12b of the first container 11a. The coupling unit 12d of this exemplary embodiment is applicable to, for example, embodiments of the first port 12a and the second port 12c of the fuel cartridge 10 as shown in FIG. 1A.

Referring to FIGS. 2A and 2B, the coupling unit 12d includes a first frame 30 having an port formed in the second container 11b, and a second frame 31 coupled to a middle portion of the first frame 30 at an angle of about 90°, and arranged in a central region of the port while closing the port formed in the first frame 30; a third frame 32, in the form of a dumbbell, with a middle portion fit into a throughhole 31a; and an elastic member 34 installed between the second frame 31 and the third frame 32 so that the third frame 32 is elastically coupled to the second frame 31 therethrough.

For the above-mentioned configuration of the coupling unit 12d, the first frame 30 extends from the second container 11b of the fuel cartridge 10 as shown in FIG. 1A at a constant length. A coupling groove 30a is formed on one side of an end of the first frame 30, for example, the outside, in the illustrated embodiment. The coupling groove 30a may be used as a means for fixing the second coupling unit 12d to a first coupling unit 12b or a connection pipe. The third frame 32 has a body portion 32a corresponding to the middle portion of a dumbbell; a first header 33a coupled to a first end of the body portion 32a; and a second header 33b coupled to the second end of the body portion 32a. The body portion 32a has a hollow portion and a side surface port 33c fluidly coupled to the hollow portion. And, the second header 33b has a throughhole 33d fluidly coupled to the hollow portion of the body portion 32a. The first header 33a of the third frame 32 has a cross-sectional area or a diameter that is smaller than the port formed by the first frame 30. The elastic member 34 is compressed by a force (F) from the first coupling unit 12b or connection pipe coupled to the second coupling unit 12d. The elastic member 34 may comprise a spring surrounding the body portion 32a of the third frame 32.

A method for operating the above-described second coupling unit 12d will be described in detail, as follows with reference to the embodiment illustrated FIGS. 2A and 2B. When an external force (F) is applied to the third frame 32 of the second coupling unit 12d in the configuration illustrated in FIG. 2A, the third frame 32 is urged to a certain depth into the throughhole 31a of the second frame 31, as shown in FIG. 2B. At this time, the side surface port 33c of the body portion 32a of the third frame 32 is fluidly exposed to an inner space of the second container 11b of the fuel cartridge 10. Accordingly, the second fuel compressed and stored in the inner space of the second container 11b sequentially passes through the side surface port 33c of the body portion 32a of the third frame 32, the hollow portion of the body portion 32a, and the throughhole 33d of the second header 33b of the body portion 32a, and therefore pressurizes the liquid first fuel stored in the first container 11a of the fuel cartridge 10, thereby discharging the first fuel stored in the first container 11a through the first port 12a (FIG. 1A) under a predetermined pressure.

Meanwhile, when the external force (F) applied to the third frame 32 of the second coupling unit 12d is removed, the third frame 32 is pushed out to a certain depth through the through-hole 31a of the second frame 31 by means of the restoring force of the elastic member 34, and therefore the third frame 32 returns to the normal position, as shown in FIG. 2A. At this time, the header 33a of the third frame 32 closes the side surface port 33c so that the pressure of the second fuel compressed and stored in the second container 11b cannot affect the first fuel stored in the first container 11a.

The embodiment of the second coupling unit 12d simplifies coupling the second container 11b (FIG. 1A) to the first container 11a of the fuel cartridge 10, coupling the first port 12a or the second port 12c to a connection pipe, and preventing leakage of the first fuel or the second fuel during an undesirable detachment in the fuel system.

FIG. 3 is a schematic view showing an embodiment of a direct methanol fuel cell having an embodiment of the fuel cartridge 10.

The direct methanol fuel cell according to this exemplary embodiment comprises two fuels stored in the fuel cartridge 10 that can be supplied to the fuel cell body 20 without the assistance of a fuel pump, and permits an anode and a cathode of the fuel cell body 20 to be purged during the operation of the fuel cell system.

Referring to FIG. 3, the direct methanol fuel cell includes a fuel cartridge 10 storing two fuels; a controller 19 for controlling the overall operation of the system comprising the fuel cartridge 10; a fuel cell body 20 operated in a direct methanol fuel cell mode; and a recycler 40 for re-using unreacted fuels and water flowing out from the fuel cell body 20. And, the direct methanol fuel cell has a pipe or conduit 28 fluidly coupling the first port 12a and the second port 12c of the fuel cartridge 10 to the anode inlet of the fuel cell body 20.

The fuel cartridge 10 is describe in greater detail above The fuel cartridge 10 includes a first valve 17a fluidly coupled to the first port 12a; a second valve 17b coupled fluidly to the second port 12c of the fuel cartridge 10; and a subvalve 16a fluidly coupled to the subpipe 16 coupling the first storage unit 13 containing the first fuel to the second storage unit 14 containing the second fuel.

However, according to this exemplary embodiment, the fuel cartridge 10 further includes another inlet 12e through which unreacted fuel and water may be transferred from the mixing tank 40b; and an inner guide unit 15a guiding the unreacted fuel and water therein. The inner guide unit 15a may comprise a barrier rib that functions to supply the unreacted fuel and water flowing in from the mixing tank 40b to the fuel cell body 20 through the first storage unit 13 together with the first fuel.

In the illustrated embodiment, the controller 19 controls a subvalve 16a, a first valve 17a, and a second valve 17b so that the first fuel and the second fuel of the fuel cartridge 10 can be supplied to the fuel cell body 20 at the same time or selectively. Also, the controller 19 controls a first switching unit 17c, a second switching unit 17d, and a third switching unit 17e that open or close each of the ports. In addition, in embodiments in which a temperature maintenance unit is installed in the fuel cartridge 10, the controller 19 may control the temperature maintenance unit for operation in a desired manner, or generally control components of other systems, for example, to monitor temperature and output of the fuel cell body 20 and/or to stably operate the systems. The above-mentioned controller 19 may comprise logic circuits, computers, and/or microprocessors known in the art.

The fuel cell body 20 has a stack structure comprising a plurality of alternately stacked membrane electrode assemblies (MEAs) 21 and separators 22. The membrane electrode assembly 21 comprises an anode, a cathode, and an electrolyte membrane disposed between the anode and the cathode. The anode corresponds to an anode electrode, and the cathode corresponds to a cathode electrode. The anode of the fuel cell body 20 receives a fuel from the fuel cartridge 10, and the cathode receives the air from an air supply apparatus (not shown) such as an air pump, or the like. {Replace "laminated" with "alternately stacked" as more accurate}

In order to improve physical properties such as electrochemical reactivity, ion conductivity, electron conductivity, fuel transmissibility, by-product transmissibility, interfacial stability, etc., the anode and the cathode may comprise a catalyst layer and a diffusion layer. That is to say, the anode electrode may include a catalyst layer, a microporous layer, and a backing layer. Similarly, the cathode electrode may include a catalyst layer, a microporous layer, and a backing layer.

The catalyst layers of the anode electrode and the cathode electrode catalyze the redox reaction so that the supplied fuel or oxidizing agent can chemically react rapidly. The catalyst layer preferably includes at least one metal catalyst selected from the group consisting of platinum, ruthenium, osmium, platinum-ruthenium alloy, platinum-osmium alloy, platinum-palladium alloy, and platinum-M alloy where M is at least one transition metal selected from the group consisting of Ga, Ti, V, Cr, Mn, Fe, Co, Ni, Cu, and Zn. The catalyst may be supported. In embodiments in which the catalyst has sufficient conductivity, the catalyst itself may be used as the support, but a carbon support is preferred.

The microporous layers of the anode electrode and the cathode electrode function to evenly supply a fuel or an oxidizing agent to each of respective catalyst layers, and, in particular, the microporous layer in the cathode functions to easily discharge water generated in the catalyst layer of the cathode. Each of the above-mentioned microporous layers may comprise a carbon layer coated onto each of the respective backing layers. Also, each of the microporous layers may include at least one carbon material selected from the group consisting of graphite, carbon nanotubes (CNT), fullerene ($C_{60}$), activated carbon, Vulcan® carbon black (Cabot, Alpharetta, Ga.), Ketjen Black® (Goliath, Tokyo, Japan), carbon black, and carbon nanohorns, and may further include at least one binder selected from the group consisting of poly(perfluorosulfonic acid), poly(tetrafluoroethylene), and fluorinated ethylene-propylene.

Each of the backing layers of the anode electrode and the cathode electrode functions to support the catalyst layers, and also to disperse a fuel, water, air, etc., to collect the electricity generated thereat, and to prevent the loss of the catalyst layer materials. The above-mentioned backing layers may comprise carbon materials such as carbon cloth, carbon paper, and the like.

The electrolyte membrane may comprise a hydrogen-ion conductive-polymer, for example fluorinated polymer, ketone polymer, benzimidazole polymer, ester polymer, amide polymer, imide polymer, sulfone polymer, styrene polymer, hydrocarbon polymer, and the like. Specific examples of the hydrogen-ion conductive-polymer, include without limitation poly(perfluorosulfonic acid), poly(perfluorocarboxylic acid), sulfonic acid-group-containing tetrafluoroethylene and fluorovinylether copolymer, perfluorinated polyetherketone sulfide, aryl ketone, poly(2,2'-(m-phenylene)-5,5'-bibenzimidazole), poly(2,5-benzimidazole), polyimide, polysulfone, polystyrene, polyphenylene, and the like. Also, the electrolyte membrane preferably has a thickness of less than about 0.1 mm for the purpose of effective passage of hydrogen ions.

A solvent may be used for manufacturing an electrolyte membrane. At this time, suitable solvents includes alcohols, such as ethanol, isopropyl alcohol, n-propyl alcohol, and butyl alcohol, water, dimethylsulfoxide (DMSO), N,N-dimethylacetamide (DMAc), and N-dimethylpyrrolidone (NMP), which may be used alone or in combination.

A separator 22, also referred to as a bipolar plate, is disposed on each side of the membrane electrode assembly 21. The separator 22 has a fuel flow field and an oxidant flow field, both of which are formed in a surface contacting the membrane electrode assembly 21. The above-mentioned separator 22 preferably comprises thin and light-weight materials having suitable physical properties such as electric conductivity, air tightness, corrosion resistance, hardness, and good processability. The separator 22 may be made of a carbon/polymer composite using graphite, carbon, metal, and carbon as a conductive material, and a metal/polymer composite using one or more metals as a conductive material. Thermoplastic resin and/or thermosetting resin may be used as the polymer, and polypropylene, polyethylene, polyvinylidene fluoride (PVDF), combinations, and the like may be used as the thermoplastic resin, and phenolic resin, epoxy resin, vinyl ester-based resin, combinations, and the like may be used as the thermosetting resin. Meanwhile, in embodiments in which the separator comprises metal, the separator 22 is preferably comprises a metals and/or alloy surface-coated with materials with suitable corrosion resistance so as to prevent the contamination of the membrane electrode assembly 21 from the damage of the separator by corrosion and dissociation of the metal and/or alloy.

Also, the fuel cell body 20 may include an end plate and a coupling unit for applying substantially constant pressure to the stacked structure of the membrane electrode assembly 21 and the separator 22; and a gasket for preventing the leakage of by-products generated in stacked structure by the reaction of the fuel cell with the reactants, including a fuel and an oxidizing agent.

A recycler 40 includes a condenser 40a for condensing vapor flowing out from the cathode of the fuel cell body 20; and a mixing tank 40b. The mixing tank 40b stores a fluid including unreacted fuel flowing out from the fuel cell body 20; and a fluid including water flowing out from the condenser 40a, and supplies the stored unreacted fuel and water to the fuel cartridge 10. Unlike a typical recycler, the recycler 40 according to this exemplary embodiment does not directly supply the stored unreacted fuel to the fuel cell body 20, but supplies the stored unreacted fuel to the fuel cell body 20 through the fuel cartridge 10.

The mixing tank 40b includes a first inlet 41 coupled to an anode outlet of the fuel cell body 20; a second inlet 42 coupled to a cathode outlet of the fuel cell body 20; an exhaust unit 43 for exhausting undesirable gases such as carbon dioxide, etc.; and a discharging unit 44 for discharging unreacted fuel and water, stored therein, to the fuel cartridge 10. A first switching unit 17c for controlling an opening of the cathode outlet is installed to the cathode outlet of the fuel cell body 20, and a condenser 40a is coupled to a front-end of the second inlet 42 of the mixing tank 40b. A second switching unit 17d for controlling an opening of the exhaust unit 43 of the mixing tank 40b is installed to the exhaust unit 43. A third switching unit 17e for controlling an opening of the discharging unit 43 of the mixing tank 40b is installed to a second outlet 44 of the mixing tank 40b. The first, second, and third switching units 17c, 17d, 17e simply open or close the appropriate port in some embodiments, and comprise, for example, any suitable valve or port-switching apparatus.

The condenser 40a includes a water-cooling machine using a liquid such as water as a coolant or an air-cooling machine using naturally circulating air as a coolant. Meanwhile, the condenser 40a may be installed at the front ends of the first inlet 41 and/or the second inlet 42 of the mixing tank 40b as desired.

The operation of the above-mentioned direct methanol fuel cell will be described in detail, as follows. When the fuel cartridge 10 is mounted on the fuel cell system to supply a fuel to the fuel cell body 20, the controller 19 closes the first valve 17a of the fuel cartridge 10 and opens the second valve 17b so as to preferentially supply a gaseous second fuel stored in the second storage unit 14 to the fuel cell body 20. One reason to supply the gaseous second fuel to the fuel cell body 20 before supplying a liquid first fuel is to initially humidify the fuel cell body 20 since dimethyl ether used as the second fuel generates water through the electrochemical reaction with the fuel cell. The electrochemical reaction of dimethyl ether in the fuel cell body 20 is shown in SCHEME 1, below.

SCHEME 1

Anode:
$$CH_3OCH_3 + 3 H_2O \longrightarrow 2 CO_2 + 12 H^+ + 12 e^-$$

Cathode:
$$3 O_2 + 12 H^+ + 12 e^- \longrightarrow 6 H_2O$$

Next, the controller 19 closes the second valve 17b and opens first valve 17a so as to supply a liquid first fuel stored in the first storage unit 13 to the fuel cell body 20. When the liquid first fuel is exhausted, dimethyl ether as a gas-phase second fuel may be continuously supplied to the fuel cell body 20. Where the first fuel is an aqueous methanol solution, the electrochemical reaction in the fuel cell body 20 is as follows in SCHEME 2.

SCHEME 2

| Anode: |  |
| Cathode: | 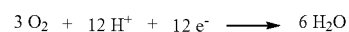 |

For the above-mentioned direct methanol fuel cell, the energy density of methanol used as the first fuel is about 5040 kcal per kg, and the energy density of dimethyl ether used as the second fuel is about 6903 kcal per kg. As a result, some embodiments exhibit an improved power density compared with typical direct methanol fuel cells only methanol as the fuel. Also, the dimethyl ether a reduced crossover flux, that is, where fuel passes through a polymer electrolyte membrane from an anode to a cathode in the fuel cell body 20, compared with methanol. That is to say, the fuel efficiency of the direct methanol fuel cell may be improved. Also, if gaseous dimethyl ether and liquid methanol are supplied alternately, it is desirable to use pure methanol as the liquid first fuel since water generated through the reaction of dimethyl ether in the fuel cell is provided to the electrolyte membrane. Also, the use of the liquid first fuel and the gaseous second fuel makes it possible to easily indicate the remaining amount of the fuel by using the time point at which the liquid first fuel is exhausted, thereby providing improved information to the user concerning the time to exchange of the fuel cartridge when the gaseous second fuel is exhausted.

Also, the above-mentioned direct methanol fuel cell has an advantage that an anode and cathode purging processes may be carried out during the operation of the fuel system. The operation of the fuel system will be described in detail with reference to the accompanying drawings, as follows.

Figure 4:
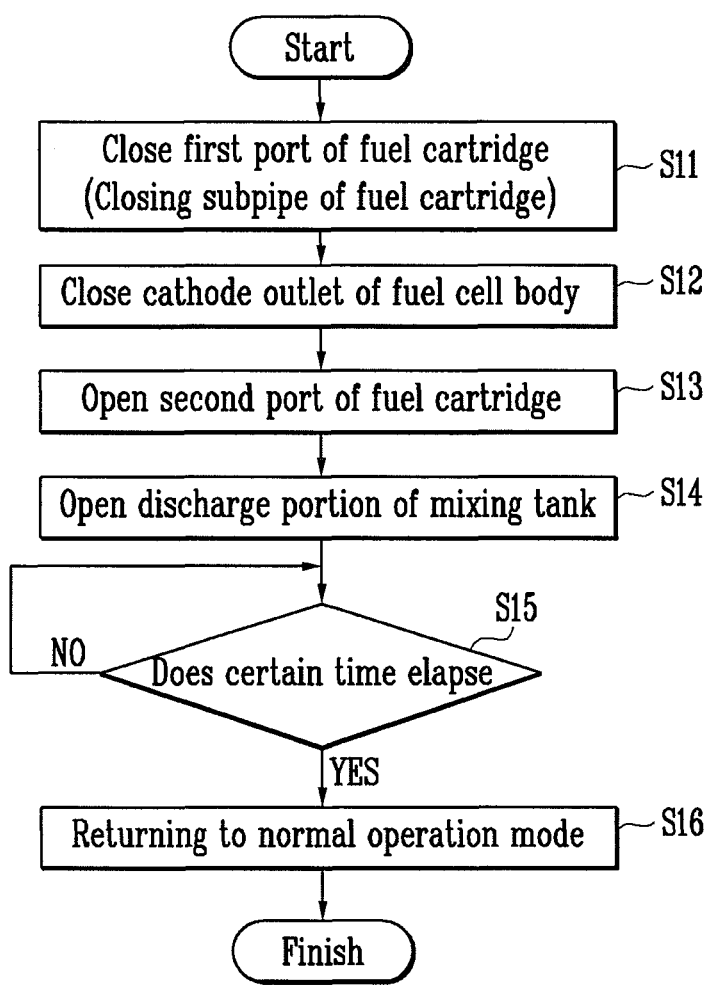
FIG. 4 is a flowchart illustrating an embodiment of a method of purging an anode of the direct methanol fuel cell having an embodiment of the fuel cartridge.

FIG. 4 is a flowchart illustrating an embodiment of a method of purging an anode of the direct methanol fuel cell having an embodiment of the fuel cartridge. Referring to FIGS. 3 and 4, the controller 19 closes the first valve 17a, thereby closing off the first port 12a of the fuel cartridge 10 during the operation of the direct methanol fuel cell system in step S11. And, the controller 19 closes the first switching unit 17c, thereby closing off the cathode outlet of the fuel cell body 20 in step S12. Then, the controller 19 opens the second valve 17b, thereby connecting the second port 12c so as to supply the second fuel, compressed and stored in the second storage unit 14 of the fuel cartridge 20, to the anode of the fuel cell body 20 in step S13. In addition to step S13, the controller 19 opens the third switching unit 17e, thereby connecting the discharge portion 44 of the mixing tank 40b so as to discharge unreacted fuel and water stored in the mixing tank 40b into the fuel cartridge 10 in step S14. Meanwhile, the controller 19 may close the subvalve 16a, thereby closing off the subpipe 16 that fluidly couples the second storage unit 14 to the first storage unit 13 of the fuel cartridge 10, if desired, before steps S13 and/or S11.

In some embodiments, above-mentioned anode purging process is preferably carried out for from about 10 seconds to about 30 seconds during the operation of the fuel cell system. Where the time of the anode purging process is less than about 10 seconds, the anode purging may not be carried out to the desired level, whereas the continuous operation of the fuel cell body 20 may be affected adversely if the time exceeds about 30 seconds. Those skilled in the art will understand that other embodiments use purging processes of different duration, for example, less than about 10 seconds, at least about 10 seconds, and/or greater than about 30 seconds, depending on the particular system and/or the operating parameters thereof.

After the anode purging process is completed, the above-mentioned direct methanol fuel cell system returns to the normal operation mode. The normal operation mode may include a mode in which the second valve 17b is closed, the first valve 17a and the first, second, and third switching units 17c, 17d, 17e are opened where a sufficient amount of the first fuel remains in the first storage unit 13.

By carrying out the above-mentioned anode purging process, the clogging phenomenon of the fuel flow path caused by the accumulation of carbon dioxide may be reduced and/or prevented since carbon dioxide that accumulates at the anode of the fuel cell body 20 after the fuel cell system operates for an extended time may be forcibly discharged. Accumulated carbon dioxide at the anode can result in insufficient fuel at the anode and accelerated deterioration of the anode catalyst, resulting deterioration in the performance of the fuel cell. Accordingly, the fuel cartridge may be useful in preventing the deterioration in the performance of the fuel cell and providing stable operating conditions of the fuel system for an extended time.

Figure 5:
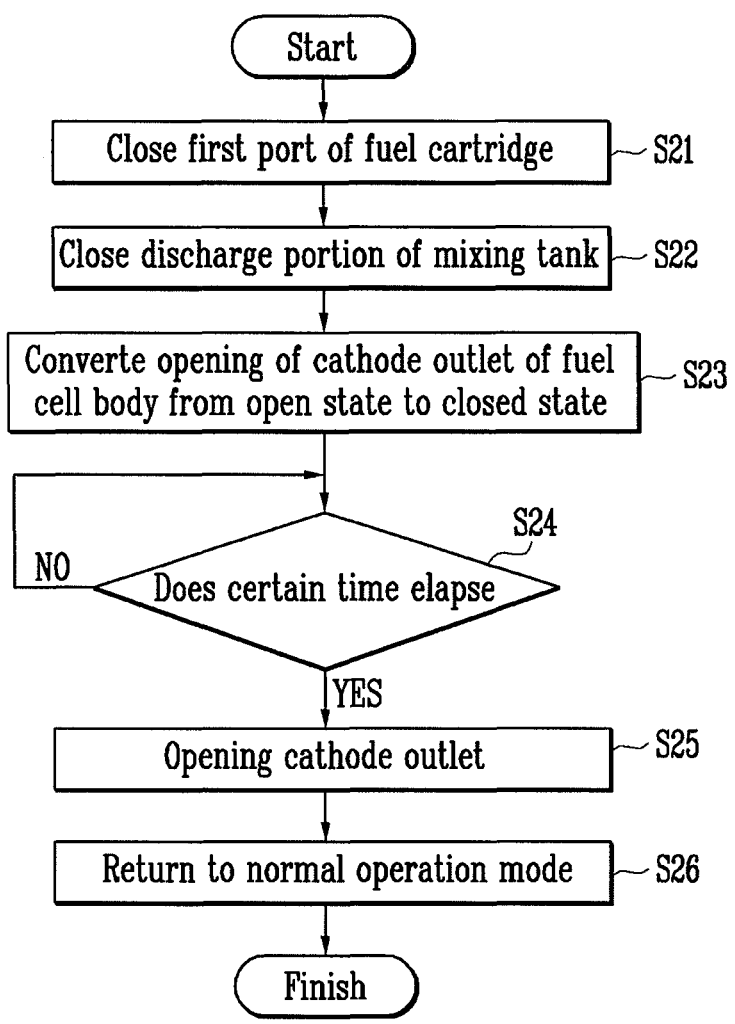
FIG. 5 is a flowchart illustrating an embodiment of a method of purging a cathode of the direct methanol fuel cell having an embodiment of the fuel cartridge.

FIG. 5 is a flowchart illustrating an embodiment of a method of purging a cathode of the direct methanol fuel cell having an embodiment of the fuel cartridge. Referring to FIG. 3 and FIG. 5, the controller 19 closes the first valve 17a, thereby closing off the first port 12a of the fuel cartridge 10 during the operation of the direct methanol fuel cell system in step S21. And, the controller 19 closes the third switching unit 17e, thereby closing off the discharging unit 44 of the mixing tank 40b in step S22.

Next, the controller 19 closes the first switching unit 17c, thereby converting the state of the opening of the cathode outlet of the fuel cell body 20 from an open state to a closed state in step S23. And, the controller 19 maintains this configuration for a predetermined time, for example from about 10 to about 30 seconds in step S24. After the predetermined time has elapsed, the controller 19 opens again the first switching unit 17, thereby reconnecting the cathode outlet in step S25. And, after the cathode purging process is completed, the controller 19 returns the system to the normal operation mode in step S26.

In some embodiments, where the duration of the purge in step S24 is than about 10 seconds, the cathode purging may not be carried out to the desired level, whereas the continuous operation of the fuel cell body 20 may be affected adversely if the time exceeds about 30 seconds. Those skilled in the art will understand that different purge times are used in other embodiments.

By carrying out the above-mentioned cathode purging process, water flooding at the cathode may be reduced and/or prevented by removing moisture in the cathode flow path of the fuel cell body 20 and the gas diffusion layer of the cathode after the fuel cell system operated for an extended time. Water at the cathode can result in an insufficient amount of oxidizing agent at the cathode and accelerated deterioration of the cathode support, leading deterioration in the performance of the fuel cell. Accordingly, the fuel cartridge may be useful in improving the performance of the fuel cell and preventing deterioration in the performance of the fuel cell.

Embodiments of fuel cartridge have one or more advantages, including the elimination of a fuel pump, resulting in a small and light-weight fuel system and a reduced noise level, as well as an improved energy density compared with fuel cells using only methanol as the fuel. In addition, some embodiments provide improved notice to the user for fuel cartridge exchange.

Also, some embodiments provide a high-efficiency direct methanol fuel cell having a novel structure comprising a fuel cartridge storing two fuels. In addition, some embodiments provide a high-reliability direct methanol fuel cell capable of easily purging an anode and a cathode during the operation of the fuel system.

Although certain exemplary embodiments have been shown and described, it would be appreciated by those skilled in the art that changes might be made in these embodiments without departing from the principles and spirit of the disclosure, the scope of which is defined in the claims and their equivalents.

What is claimed is:

1. A fuel cell fuel cartridge system, comprising:
a first storage unit configured for storing a liquid first fuel, the first storage unit comprising a first container, a first coupling unit formed in a wall of the first storage unit and fluidly connected to the first container, and a first fluid port; and
a second storage unit configured for storing a second fuel at a substantially constant pressure, the second storage unit comprising a second container, a second coupling unit formed in a wall of the second storage unit, and a second fluid port,
wherein the second storage unit is configured to engage with the first storage unit by directly contacting the walls of the first and second storage units having the first and second coupling units and the first coupling unit is configured to detachably engage with the second coupling unit so that a port is formed in at least one of the first coupling unit and the second coupling unit, the port configured to open and fluidly connect the first container to the second container, and the second container configured to pressurize the first storage unit, wherein the port is formed on a side surface of a hollow rod portion slidably positioned in a through hole, the hollow rod portion attached to a first header on a first side of the through hole and a second header on a second side of the through hole, and wherein the hollow rod portion is configured to conduct a fluid between the second coupling unit and the first coupling unit through the hollow rod portion.

2. The fuel cartridge system of claim 1 further comprising a first valve disposed between the first fluid port and the first container, wherein the first valve controls a fluid flow through the first fluid port.

3. The fuel cartridge system of claim 2, further comprising a second valve disposed between the second fluid port and the second container, wherein the second valve controls a fluid flow through the second fluid port.

4. The fuel cartridge system of claim 3 further comprising a controller coupled to the first valve and the second valve, wherein the controller is configured for independently controlling the first valve and the second valve, thereby permitting supply of the first fuel from the first storage unit and the second fuel from the second storage unit either simultaneously or separately.

5. The fuel cartridge system of claim 1 further comprising a temperature maintenance unit coupled to the second storage unit and configured for maintaining a temperature of the second storage unit within a predetermined temperature range.

6. The fuel cartridge system of claim 1, wherein the first fuel comprises methanol and the second fuel comprises dimethyl ether.

7. The fuel cartridge system of claim 1 further comprising an elastic member positioned around a perimeter of the hollow rod portion.

* * * * *